June 26, 1951 — G. W. COOPER — 2,558,340
LEDGER BAR ADJUSTMENT FOR MOWING MACHINES
Filed Nov. 26, 1949 — 3 Sheets-Sheet 1
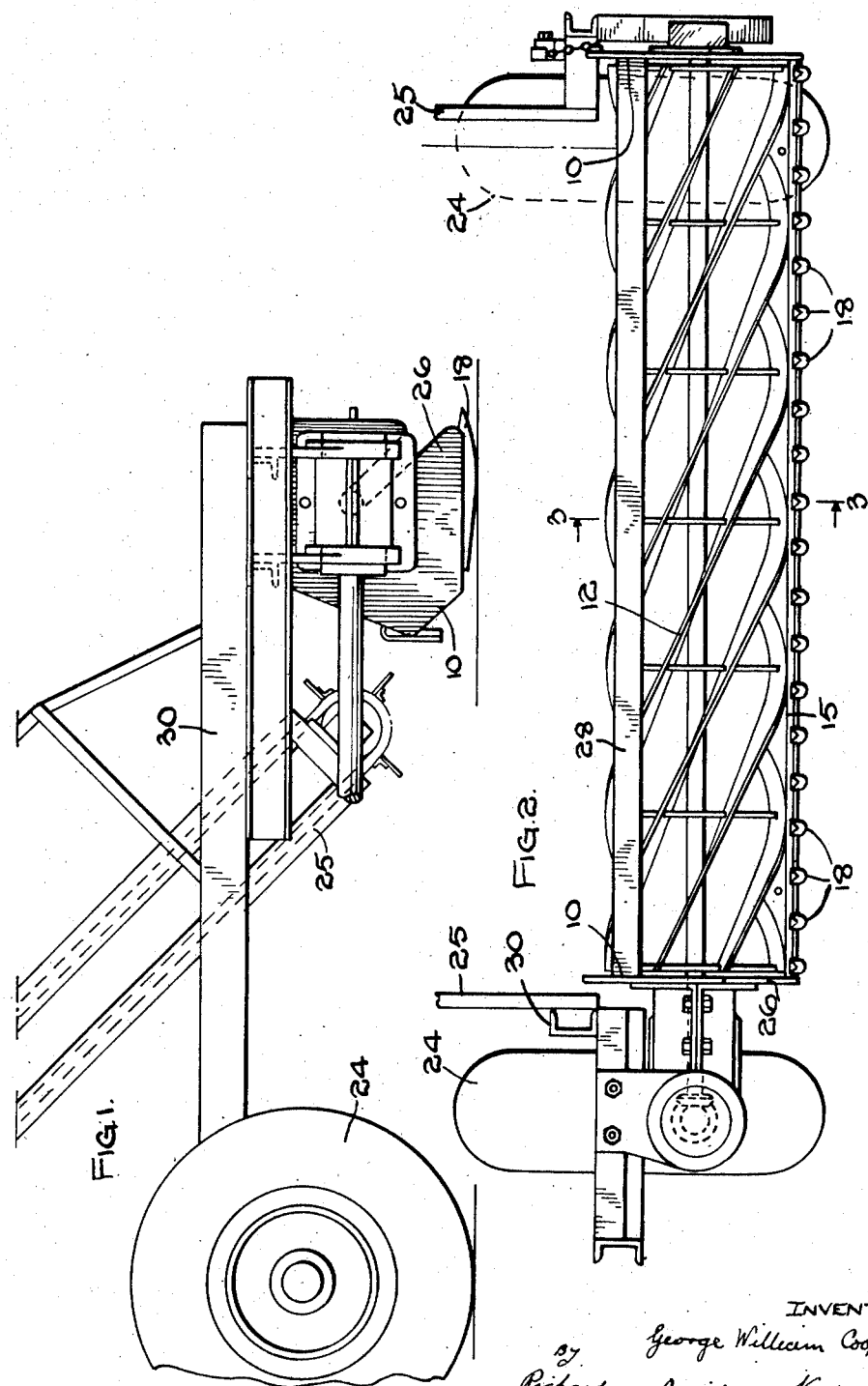
INVENTOR:
George William Cooper
by Richardson, David and Verdon
Attys

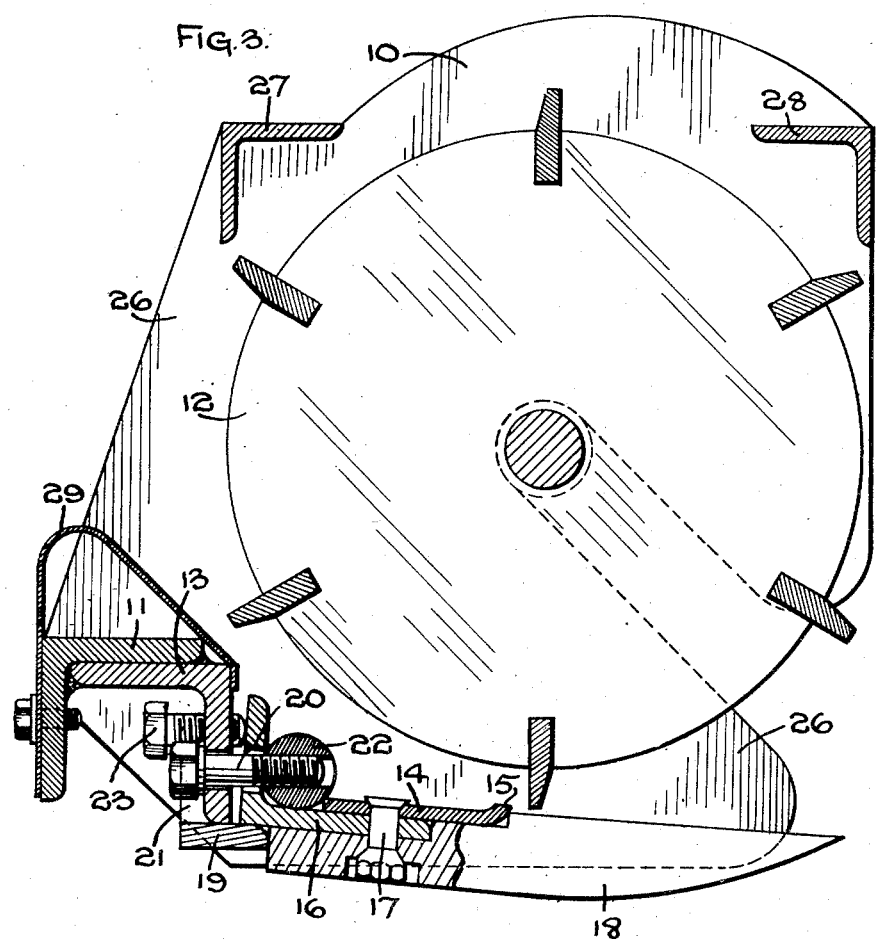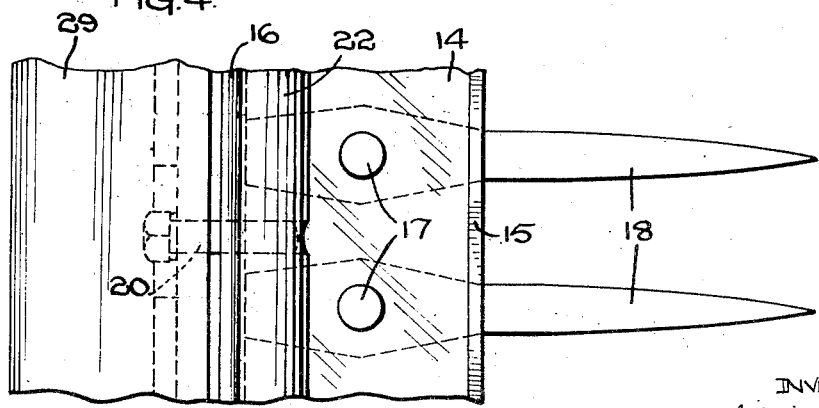

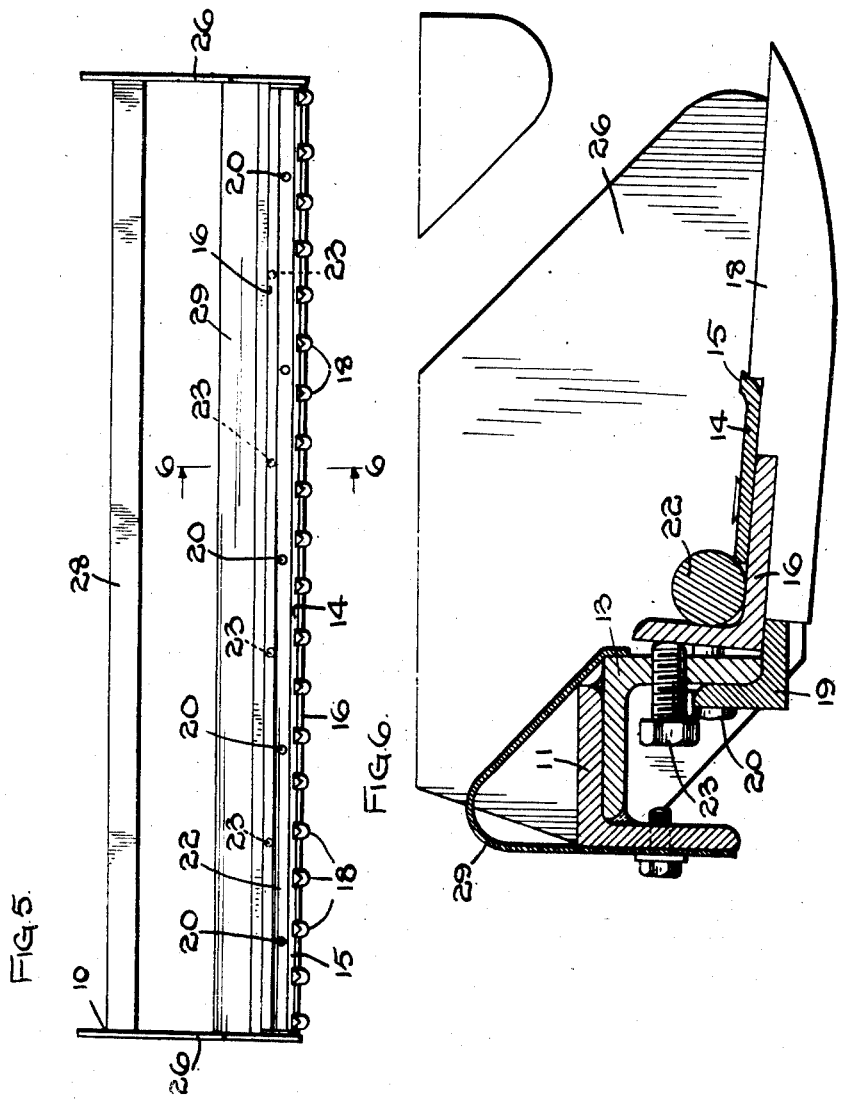

Patented June 26, 1951

2,558,340

UNITED STATES PATENT OFFICE 2,558,340

LEDGER BAR ADJUSTMENT FOR MOWING MACHINES

George William Cooper, Drointon, Stowe-by-Chartley, England

Application November 26, 1949, Serial No. 129,583
In Great Britain December 1, 1948

5 Claims. (Cl. 56—294)

This invention relates to mowing machines of the kind having a frame in which is mounted horizontally a revolving cutting element incorporating longitudinal or helical cutting blades co-operating with a stationary plate adjustably mounted beneath the element, the crop being sheared by the action of the moving blades as they move over the stationary plate.

The present invention is particularly applicable to machines of the kind disclosed in prior British specification No. 624,321, which machines are for cutting and collecting grass or like crops in one operation, and comprise a frame mounted on wheels and carrying an inclined conveyor and having fitted to its forward end crop cutting means so disposed that the grass or other crop is cut and thrown by the cutter on to the conveyor and thence passed to a collecting vehicle.

The object of the present invention is to provide an improved construction.

According to the present invention, the frame at a position behind the rotating cutter is provided with a rigid transverse member and the stationary plate at its rear edge is provided with a bracket having a portion disposed transversely to the plane of the plate and the plate is secured to the frame by one or more screws passing through the transverse member of the frame and through the bracket portion and screwing into a bar or member having a portion of rounded section disposed between the plate and the bracket portion, the plate and bracket being mounted for rocking movement on the transverse member against one or more adjustable set-screws screwing into the transverse member and engaging the rear side of the bracket portion.

Preferably a row of screws is provided, the screws being disposed in spaced relationship along the transverse member. This gives support along the whole length of the plate, thereby allowing a longer cutting cylinder to be used than was previously possible.

Forwardly projecting crop-engaging fingers may be secured to the underside of the bracket.

The forward edge of the plate may project upwardly from the plane of the plate and the upper edge of this upwardly projecting portion forms the working surface of the plate and is disposed close to the orbit of the blades of the cylinder.

The invention is illustrated in the accompanying drawings, wherein

Fig. 1 is a side elevation of part of the machine according to the present invention.

Fig. 2 is an end view of the machine.

Fig. 3 is an enlarged section on the line 33 in Fig. 2.

Fig. 4 is an enlarged fragmentary plane view.

Fig. 5 is an end view showing the spacing of the two sets of screws.

Fig. 6 is a section on the line 6—6 in Fig. 5.

In the construction illustrated, the frame 10 is provided with a transverse angle-section member 11 to the rear of the lower part of the rotary cutter 12. This angle-section member has one flange disposed approximately vertically and the other flange, which is at the top and which extends forwardly, is approximately horizontal.

Welded or otherwise secured to the underside of the horizontal flange of this angle 11 is a lower angle-section member 13 having a vertical flange disposed in front of the vertical flange of the upper angle 11 and having a horizontal flange which is secured to the angle 11 as shown, and which projects rearwardly. This constitutes the upper angle member of the unit hereinafter referred to.

The revolving cutter 12 is of any suitable or usual form and the plate 14 with which it co-operates is flat, except at its forward edge 15 which is disposed in an upwardly projecting position and has its upper edge ground to co-operate with the cutter. This plate is mounted in an angle-section bracket 16 one flange of which extends below the plate 14 and the other flange of which projects upwardly at the rear of the plate 14. This bracket has secured to its underside by rivets 17, the rear parts of forwardly projecting crop-engaging fingers 18, which may be of the usual form.

The plate 14 which co-operates with the rotating cutter 12 is attached by the rivets 17 to the angle-section bracket 16 which carries the fingers 18.

Welded or otherwise secured to the lower part of the vertical flange of the angle 13 is an angle-section member 19 which constitutes the lower angle of the assembly.

The assembly of the plate 14, bracket 16 and fingers 18 forms a unit which can rock in the angle formed between portions of the upper and lower angles 13 and 19 on the frame and the said assembly is secured to the frame by means of forwardly extending screws 20 passing through slots 21 in the vertical flange of the lower angle, and passing through the vertical flange of the angle 13, and screwing into a round bar 22 located in the angle formed by the rear portion of the bracket 16. At a somewhat higher level a number of set-screws 23 engage the vertical flange of the upper angle 13 of the frame and engage the rear surface of the upwardly projecting portion of the bracket 16. By adjusting these screws 23 and also adjusting the securing screws 20, the clearance between the working edge 15 of the plate 14 and the periphery of the cutter 12 can be adjusted.

The invention is shown applied to a machine having ground wheels 24 and conveyor 25 with the cutter assembly carried between side plates 26. The main frame generally indicated by 30 in Fig. 1 also includes angle section members 27 and 28 and an inclined plate 29 is provided leading to the conveyor.

The present invention enables a longer cutting cylinder to be used than hitherto.

What I claim now is:

1. In a mowing machine of the kind specified, having a frame and a cutting cylinder mounted for rotation therein about a horizontal axis, a rigid transverse member provided in the frame at a position behind the cutting cylinder parallel to the axis thereof, a ledger plate assembly mounted on said transverse member, said assembly including a ledger plate cooperating with the cutting cylinder and a bracket having a portion which extends parallel to the plane of the ledger plate and a further portion, connected to said first portion, extending transversely to the plane of the plate, a bar of rounded section disposed in the angle between the two said portions of the bracket and extending parallel to the axis of the cutting cylinder from end to end of the ledger plate assembly, a plurality of security screws arranged in spaced relationship along the length of the transverse member, each securing screw passing loosely through the transverse member and loosely through the said transversely extending portion of the bracket and having screwed engagement with said bar, and a plurality of set screws arranged in spaced relationship along the length of the transverse member, having screwed engagement therewith and having their inner ends bearing against the said transversely extending portion of the bracket.

2. In a mowing machine of the kind specified, having a frame and a cutting cylinder mounted for rotation therein about a horizontal axis, a rigid angle section member provided in the frame at a position behind the cutting cylinder parallel to the axis thereof, one flange of said member being vertically disposed, a ledger plate assembly mounted on said vertical flange, said assembly including a ledger plate cooperating with the cutting cylinder and a bracket of angle section secured to the ledger plate with one flange of the bracket parallel to the plane of the ledger plate and the other flange extending transversely thereto and disposed in face to face relationship with the vertical flange of said rigid angle section member, a bar of circular section disposed in the angle between the flanges of said bracket and extending parallel to the axis of the cutting cylinder from end to end of the ledger plate assembly, a plurality of securing screws arranged in spaced relationship along the vertically disposed flange of said rigid angle section member each securing screw passing loosely through said vertically disposed flange and loosely through the said transversely extending flange of the bracket and having screw engagement with said bar, and a plurality of set screws arranged in spaced relationship along the length of the transverse member, having screwed engagement therewith and having their inner ends bearing against the said transversely extending flange of the bracket.

3. In a mowing machine of the kind specified, having a frame and a cutting cylinder mounted for rotation therein about a horizontal axis, a rigid transverse member provided in the frame at a position behind the cutting cylinder parallel to the axis thereof, said transverse member having a portion of angle section defined by a vertical and a horizontal flange, a ledger plate assembly mounted for rocking movement in the angle between said vertical and horizontal flanges, said assembly including a ledger plate cooperating with the cutting cylinder and a bracket having a portion which extends parallel to the plane of the ledger plate and a further portion, connected to said first portion, extending transversely to the plane of the plate, a bar of rounded section disposed in the angle between the two said portions of the bracket and extending parallel to the axis of the cutting cylinder from end to end of the ledger plate assembly, a plurality of securing screws arranged in spaced relationship along the length of the transverse member, each securing screw passing loosely through the transverse member and loosely through the said transversely extending portion of the bracket and having screwed engagement with said bar, and a plurality of set screws arranged in spaced relationship along the length of the transverse member, having screwed engagement therewith and having their inner ends bearing against the said transversely extending portion of the bracket.

4. In a mowing machine of the kind specified, having a frame and a cutting cylinder mounted for rotation therein about a horizontal axis, a rigid transverse member provided in the frame at a position behind the cutting cylinder parallel to the axis thereof, said transverse member comprising an upper angle section and a lower angle section arranged with a vertical flange of the upper section secured to a vertical flange of the lower section, a ledger plate assembly mounted for rocking movement in the lower angle section of said transverse member, said assembly including a ledger plate cooperating with the cutting cylinder and a bracket of angle section secured to the ledger plate with one flange of the bracket parallel to the plane of the ledger plate and the other flange extending transversely thereto and a bar of circular section disposed in the angle between the flanges of said bracket and extending parallel to the axis of the cutting cylinder from end to end of the ledger plate assembly, a plurality of securing screws arranged in spaced relationship along the length of the transverse member, each securing screw passing loosely through the vertical flanges of said transverse member and loosely through the said transversely extending flange of the bracket and having screwed engagement with said bar, and a plurality of set screws arranged in spaced relationship along the length of the transverse member, having screwed engagement therewith and having their inner ends bearing against the said transversely extending flange of the bracket.

5. In a mowing machine of the kind specified, having a frame and a cutting cylinder mounted for rotation therein about a horizontal axis, a rigid transverse member provided in the frame at a position behind the cutting cylinder parallel to the axis thereof, a ledger plate assembly mounted on said transverse member, said assembly including a ledger plate cooperating with the cutting cylinder and a part which extends transversely to the plane of the ledger plate, a bar of rounded section disposed in the angle between the said part and the ledger plate and having its axis parallel to the axis of the cutting cylinder, a securing screw passing loosely through the transverse member and loosely through the said part of the ledger plate assembly and having screwed engagement with said bar, and a set screw having screwed engagement with the transverse member and having its inner end bearing against the said part of the ledger plate assembly.

GEORGE WILLIAM COOPER.

REFERENCES CITED

The following references are of record in the file of this patent:

UNITED STATES PATENTS

| Number | Name | Date |
| --- | --- | --- |
| 1,721,744 | Olson | July 23, 1929 |
| 2,020,851 | Nugent | Nov. 12, 1935 |
| 2,511,457 | Booton | June 13, 1950 |
| 2,514,539 | Elliott | July 11, 1950 |

FOREIGN PATENTS

| Number | Country | Date |
| --- | --- | --- |
| 437,767 | Great Britain | Dec. 5, 1935 |